United States Patent
Lee

(10) Patent No.: US 7,495,412 B2
(45) Date of Patent: Feb. 24, 2009

(54) MOTOR DRIVING USING DISCRETE TIME OSCILLATOR

(75) Inventor: Dong-Hyun Lee, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 11/702,347

(22) Filed: Feb. 5, 2007

(65) Prior Publication Data

US 2008/0013929 A1    Jan. 17, 2008

(30) Foreign Application Priority Data

Feb. 3, 2006    (KR)    .................... 10-2006-0010756

(51) Int. Cl.
*H02P 23/00* (2006.01)
(52) U.S. Cl. ...................... 318/811; 318/599
(58) Field of Classification Search ................ 318/599, 318/811, 600, 569
See application file for complete search history.

(56) References Cited

U.S. PATENT DOCUMENTS 5,293,369 A * 3/1994 Melas et al. ............. 369/59.22
5,461,642 A * 10/1995 Hutchins et al. ............ 375/327
6,834,251 B1 * 12/2004 Fletcher ...................... 702/150

OTHER PUBLICATIONS

Korean Patent Application No. 1019900018761 to Jeong, having Publication date of Oct. 25, 1993 (w/ English Abstract page).
Korean Patent Application No. 20-1991-0023540 to Ryu et al., having Publication date of Jul. 28, 1993 (w/ English Abstract page).
Japanese Patent Publication No. JP2022923 to Rensu, having Publication date of Jan. 25, 1990 (w/ English Abstract page).
Japanese Patent Publication No. 2002-221281 to Chikara et al., having Publication date of Aug. 9, 2002 (w/ English Abstract page).

* cited by examiner

*Primary Examiner*—Rina I Duda
(74) *Attorney, Agent, or Firm*—Monica H. Choi

(57) ABSTRACT

A pulse width modulator includes a discrete time oscillator, a data storage device, a data processing block, a counter, and a comparator. The discrete time oscillator generates a first address of bits used by the data processing block for reading first data from the data storage device. The data processing block generates second data from the first data and at least one bit of the first address bits. The comparator generates a pulse width modulation signal by comparing the second data and a digital count generated by the counter.

20 Claims, 9 Drawing Sheets

MOTOR DRIVING USING DISCRETE TIME OSCILLATOR

BACKGROUND OF THE INVENTION

This application claims priority under 35 U.S.C. § 119 to Korean Patent Application No. 2006-10756, filed on Feb. 3, 2006 in the Korean Intellectual Property Office, the disclosure of which is incorporated herein in its entirety by reference.

FIELD OF THE INVENTION

The present invention relates generally to motor driving, and more particularly, to motor driving using a discrete time oscillator (DTO) to reduce noise.

BACKGROUND OF THE INVENTION

A general motor driving (or control) circuit generates a motor driving (or control) current by switching of a power device such as a power transistor, for driving a motor with a device consuming a small amount of power. FIG. 1 shows a conventional motor driving circuit using a triangular wave. FIG. 2 shows a driving voltage Vm and a driving current Im supplied to a motor 130 from the motor driving circuit of FIG. 1.

Referring to FIG. 1, the motor driving circuit includes a PWM (pulse width modulation) signal generator 110 and an inverter 120. The PWM signal generator 110 receives and compares an input signal Vi input to a positive input terminal of a comparator through a first resistor and a triangular wave signal Vts input to a negative input terminal of a comparator through a second resistor. The comparator within the PWM signal generator 110 generates a pulse signal.

In a time period where the triangular wave signal Vts is greater than the input signal Vi, the PWM signal generator 110 outputs a negative supply voltage −Vdd. In a time period where the triangular wave signal Vts is less than the input signal Vi, the PWM signal generator 110 outputs a positive supply voltage Vcc. Therefore the PWM signal generator 110 generates the pulse signal.

The inverter 120 includes power transistors Tr1 and Tr2 which are BJTs (bipolar junction transistors) in the example of FIG. 1. The bases of the BJTs Tr1 and Tr2 have the pulse signal from the PWM signal generator 110 applied thereon. The emitters of the BJTs Tr1 and Tr2 are coupled together at a node of the motor 130 having the driving voltage Vm generated thereon. A couple of diodes are connected in series between the collectors of the BJTs Tr1 and Tr2 as illustrated in FIG. 1. The diodes are coupled together at the node of the motor 130 having the driving voltage Vm generated thereon. In addition, a positive terminal of a first power source E is coupled to the collector of the first BJT Tr1, and a negative terminal of a second power source is coupled to the collector of the second BJT Tr2.

Referring to FIGS. 1 and 2, when the PWM signal generator 110 outputs the positive supply voltage Vcc, the first power transistor Tr1 is turned on so that the driving voltage Vm of the motor 130 is the positive power voltage +E. Alternatively, when the PWM signal generator 110 outputs the negative supply voltage −Vdd, the second power transistor Tr2 is turned on so that the driving voltage Vm of the motor 130 is the negative power voltage −E. A driving current Im of the motor 130 increases when the driving voltage Vm has a positive value, and decreases when the driving voltage Vm has a negative value.

In addition, as illustrated in FIG. 2, the driving current Im gradually increases as the pulse width of the driving voltage Vm increases. FIG. 3 illustrates an ideal driving voltage and an ideal driving current with respect to the rotation of a motor. FIG. 3 shows the driving voltage Vm1 and the driving current Im1 with respect to the rotation angle of a motor along the horizontal axis. The driving current Im1 is desired to follow a sine wave form. In other words, when the driving current Im1 in a sine wave form is applied to the motor, the motor rotates according to the Fleming's left hand rule.

In order to generate the driving current Im1 in a sine wave form, the pulse width of the driving voltage Vm1 is desired to vary accordingly as the sine wave form. However, the general motor driving current Im by generating the conventional motor driving circuit may not follow the sine wave form resulting in undesired noise.

SUMMARY OF THE INVENTION

Accordingly, a pulse width modulator uses a discrete time oscillator in generating a pulse width modulation signal with a pulse width varying according to a sine wave form.

The pulse width modulator according to an aspect of the present invention includes a discrete time oscillator, a data storage device, a data processing block, a counter, and a comparator. The discrete time oscillator generates a first address of bits, and the data storage device stores first data at a location indicated by a second address of bits that is a sub-set of the first address bits. The data processing block generates second data from the first data and a third address of at least one bit that is a sub-set of the first address bits. The counter generates a digital count, and the comparator generates a pulse width modulation signal by comparing the second data and the digital count.

In one embodiment of the present invention, the discrete time oscillator generates the first address bits that sequentially changes in response to a plurality of input signals. For example the discrete time oscillator includes first and second modulo registers. The first modulo register generates a first remainder and a first carry from a first sum of a first input signal and a first prior remainder, using a first reference value. The second modulo register generates a second remainder from a second sum of a second input signal, a second prior remainder, and the carry from the first modulo register, using a second reference value. The first address bits are generated from the second remainder.

In another embodiment of the present invention, the counter generates the digital count that sequentially changes in response to a clock signal.

In a further embodiment of the present invention, the comparison circuit generates the pulse width modulation signal having a pulse width that sequentially changes according to a sine wave form.

In another embodiment of the present invention, the data processing block includes an address processing unit and a data processing unit. The address processing unit generates the second address and the third address from the first address. The data processing unit generates the second data by combining the first data and the third address.

In an example embodiment of the present invention, the data processing unit includes a data processor and a memory device having sequences of instructions stored thereon. Execution of the sequences of instructions by the data processor causes the data processor to perform the steps of:

performing an exclusive OR function on the first data and a k-bit binary number with each bit being the third address that is a most significant bit of the first address to generate an exclusive OR result;

generating a (k+1) bit combination having a most significant bit that is a complement of the third address, and having the exclusive OR result as a remainder k bits;

and adding the third address to the (k+1) bit combination to generate the second data.

The pulse width modulator of the present invention may be used to particular advantage within a motor driver including a signal converting unit for generating a motor driving current having a sine wave form to a motor in response to the pulse width modulation signal.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, and 9 refer to elements having similar structure and/or function.

DETAILED DESCRIPTION OF THE INVENTION

Figure 1:
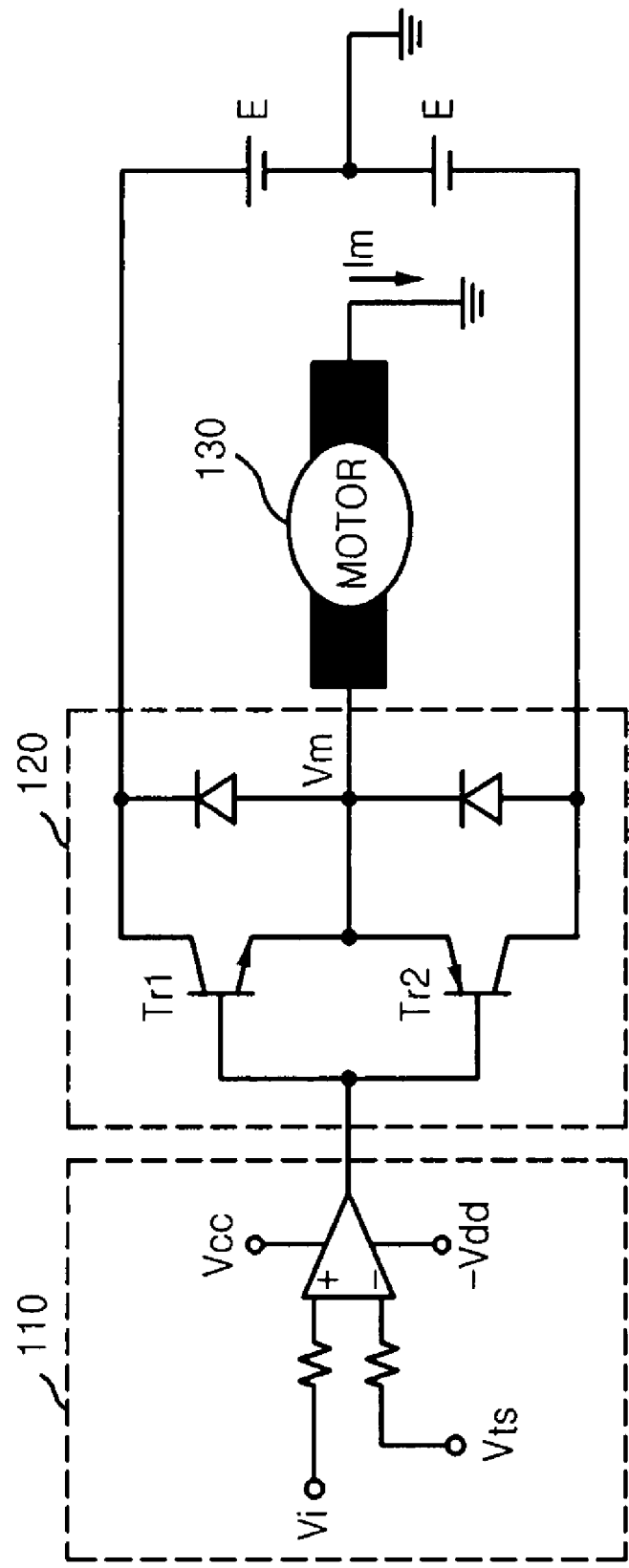
FIG. 1 is a circuit diagram of a conventional motor driving circuit using a triangular wave.
Figure 2:
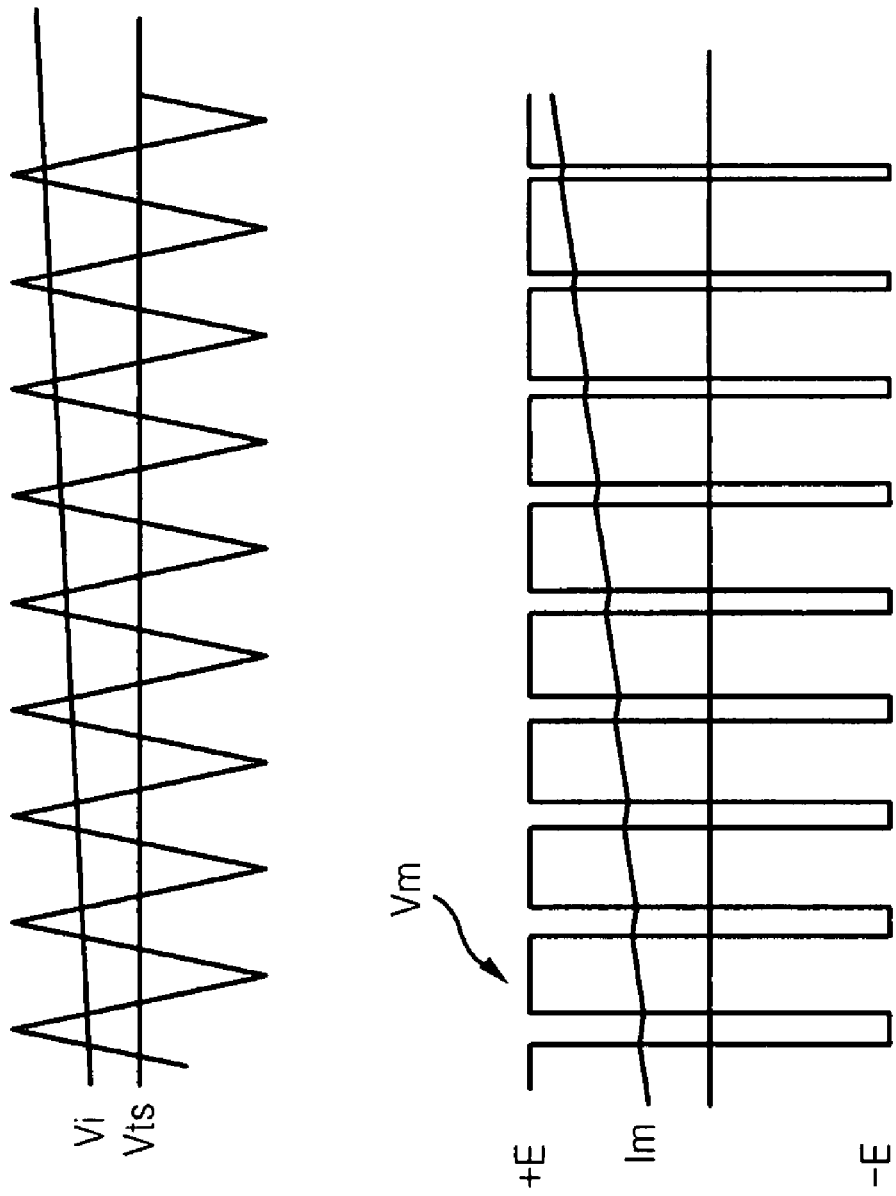
FIG. 2 is a view showing a driving voltage Vm and a driving current Im supplied to a motor from the motor driving circuit of FIG. 1.
Figure 3:
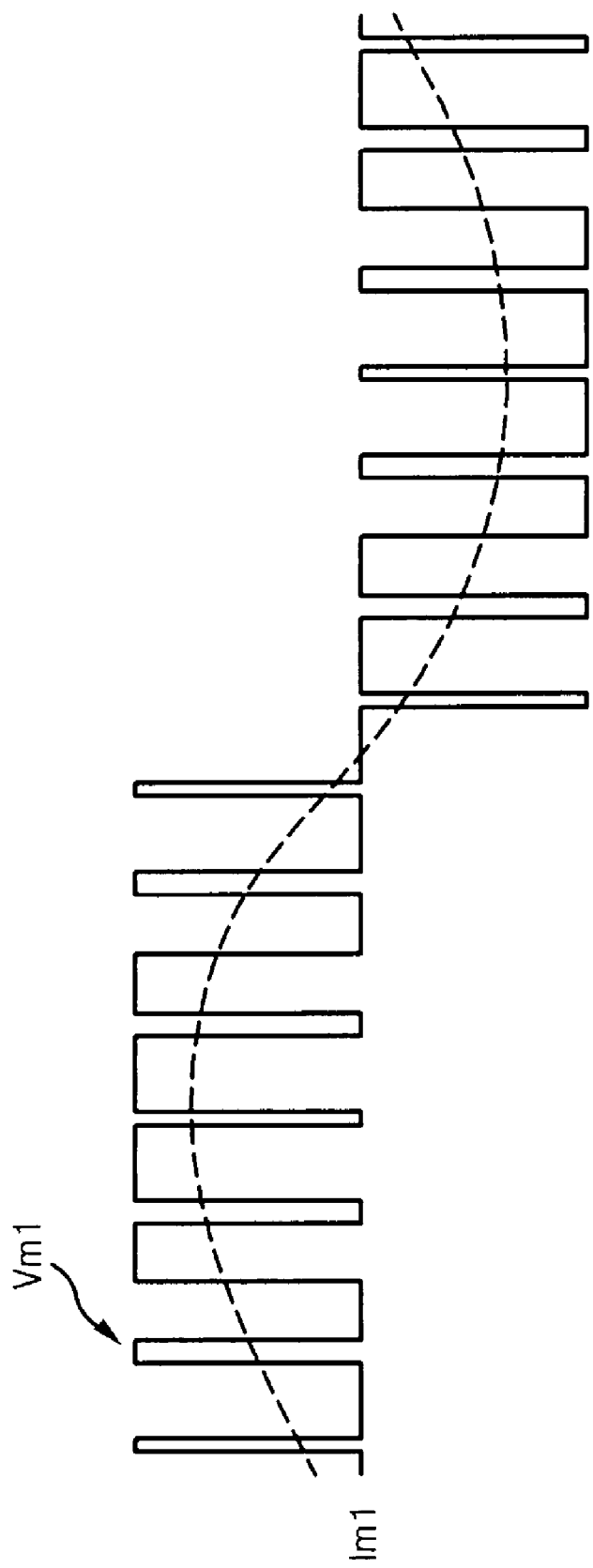
FIG. 3 illustrates ideal driving voltage and current with respect to the rotation of a motor.
Figure 4:
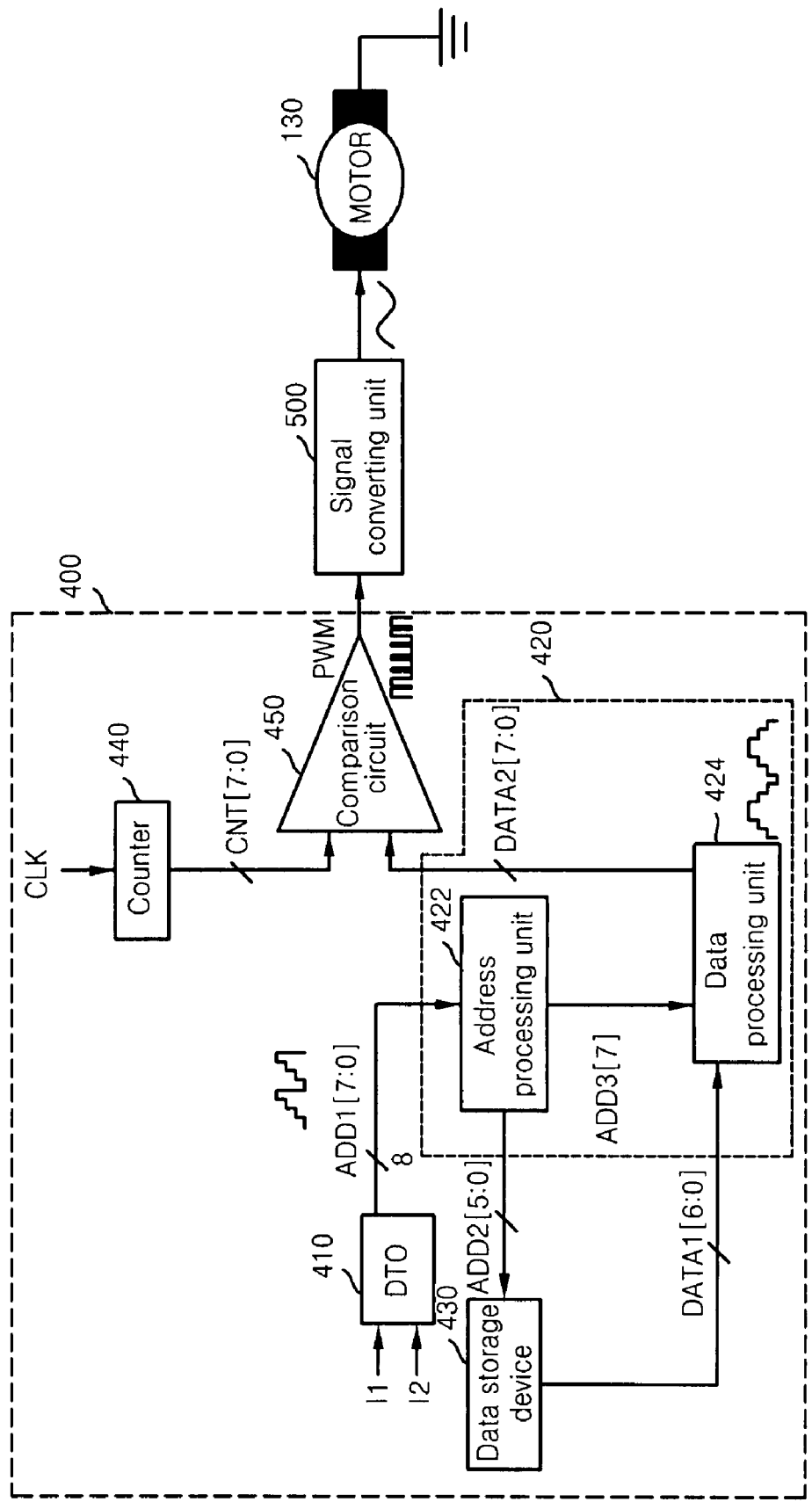
FIG. 4 is a block diagram of a circuit diagram of a motor driver using a discrete time oscillator, according to an embodiment of the present invention.
Figure 8:
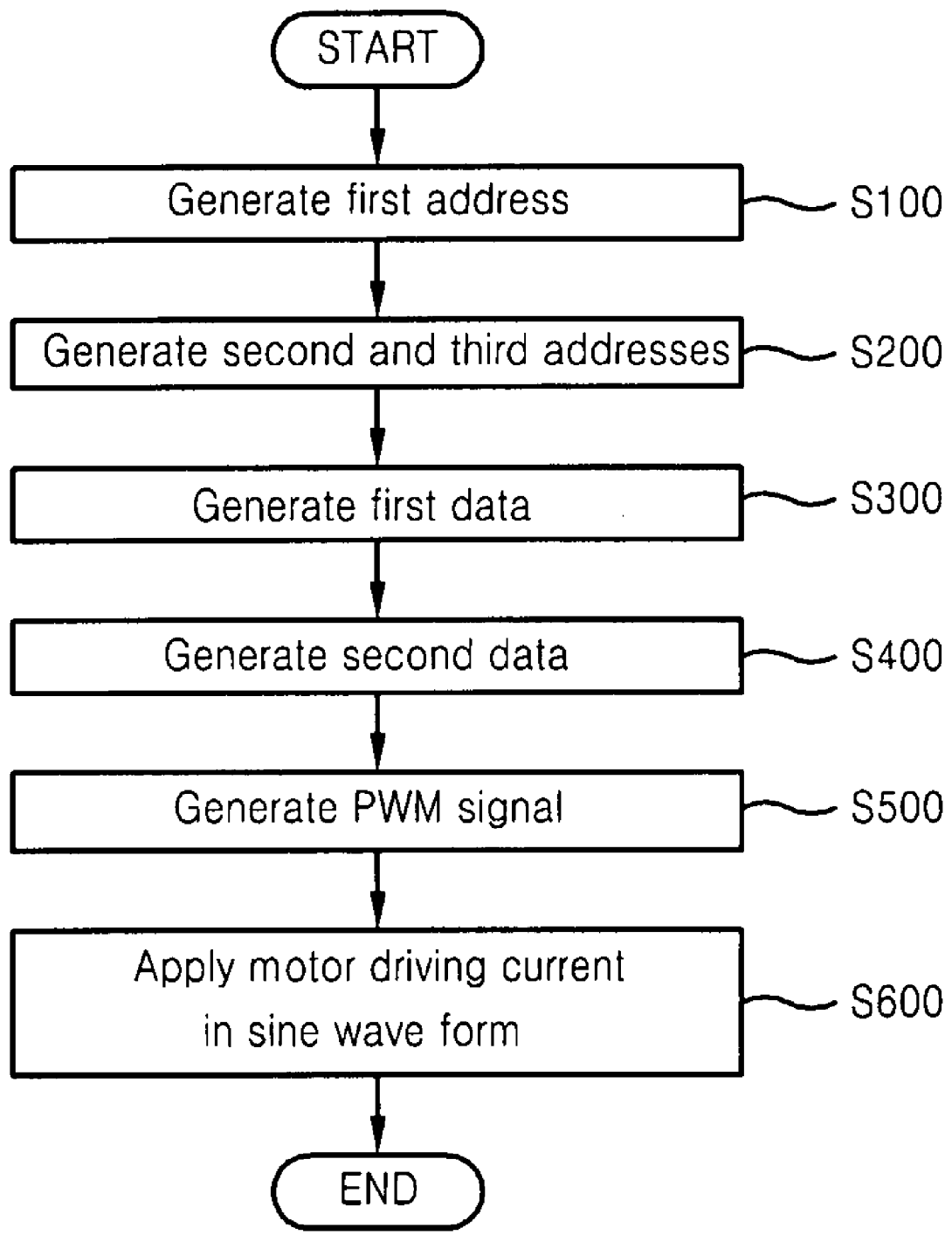
FIG. 8 is a flowchart of steps during operation of the motor driver for FIG. 4, according to an embodiment of the present invention.

FIG. 4 shows a motor driver using a discrete time oscillator (DTO) 410 according to an embodiment of the present invention. FIG. 8 shows a flowchart of steps during operation of the motor driver for FIG. 4, according to an embodiment of the present invention.

Referring to FIG. 4, the motor driver includes a pulse width modulator 400 and a signal converting unit 500. The pulse width modulator 400 generates a pulse width modulation (PWM) signal using the DTO 410 to supply motor driving current in a sine wave form to a motor 130.

The pulse width modulator 400 includes the DTO 410, a data processing block 420, a data storage device 430, a counter 440, and a comparison circuit 450. The data storage device 430 may be a non-volatile memory device such as a ROM or may be implemented with hardware and/or software for example.

Discrete time oscillators individually and generally are known to one of ordinary skill in the art. The DTO 410 generates a first address ADD1[7:0] having a plurality of bits that sequentially varies in response to input signals I1 and I2 (step S100 of FIG. 8). The input signal I1 and I2 are each an integer represented by n bits, where n is a natural number, in one embodiment of the present invention. For example, the first address ADD1[7:0] increases periodically from "00000000" to "11111111".

Figure 5:
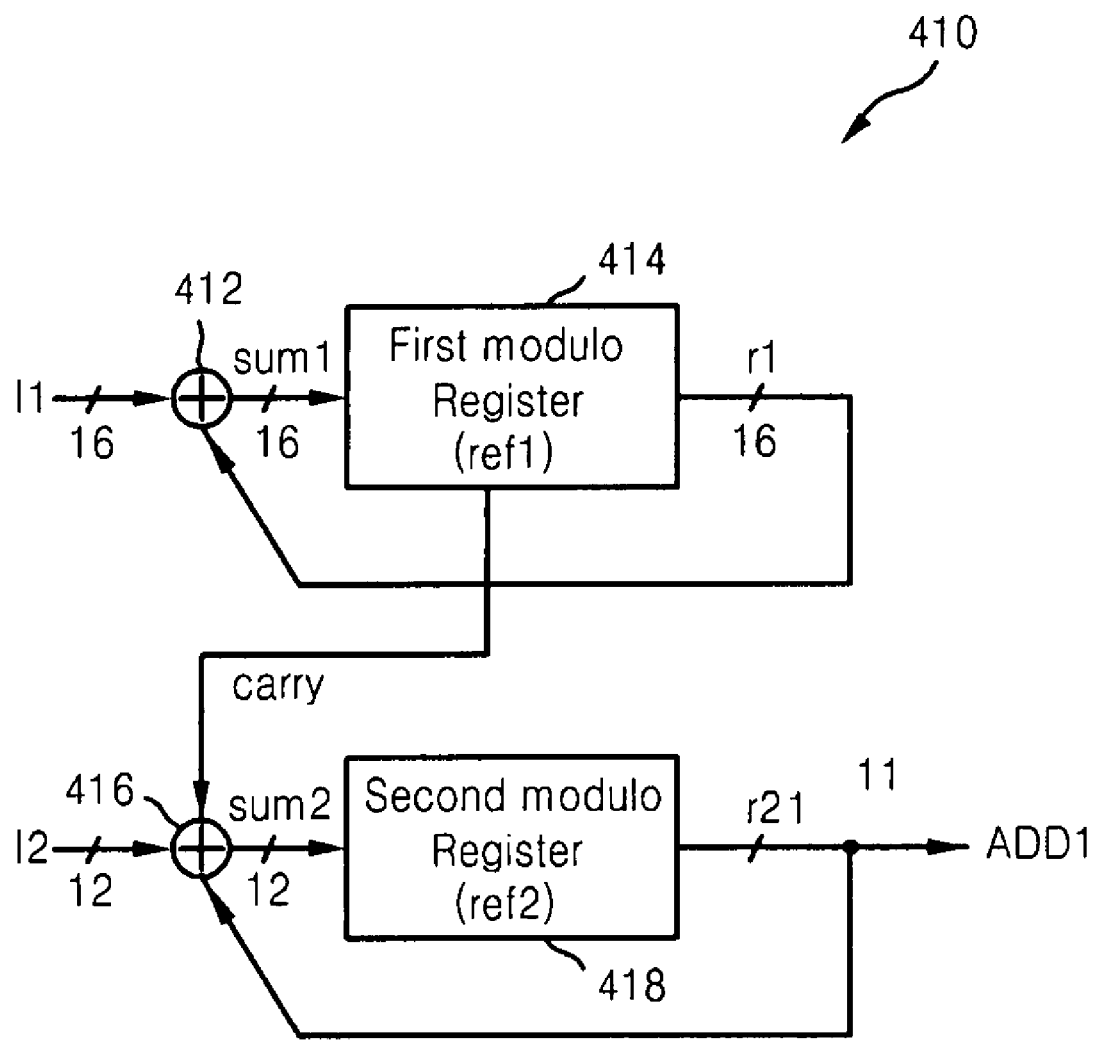
FIG. 5 is a block diagram of the discrete time oscillator in FIG. 4, according to an embodiment of the present invention.

FIG. 5 is a block diagram of the DTO 410 of FIG. 4 in one example embodiment of the present invention. Referring to FIG. 5, the DTO 410 includes a first adder 412, a first modulo register 414, a second adder 416, and a second modulo register 418.

The first adder 412 generates a first sum value sum1 from adding the first input signal I1 and a first remainder signal r1 from the first modulo register 414. The first modulo register 414 performs a modulo operation for a first reference value ref1 with respect to the first sum value sum1. When the first sum value sum1 is less than the first reference value ref1 (sum1<ref1), the first remainder signal r1 becomes the first sum value sum1. However, when the first sum value sum1 is greater than or equal to the first reference value ref1 (sum1≧ref1), a carry is generated. The first remainder signal r1 becomes a value obtained by subtracting the first reference value ref1 from the first sum value sum1 (sum1−ref1).

The first input signal I1, the first remainder signal r1, the sum value sum1, and the first reference value ref1 are n-bit integers, with n being a natural number such as 16 for example. The second adder 416 generates a second sum value sum2 by adding a second input signal I2, a second remainder signal r2 from the second modulo register 418, and the carry from the first modulo register 414.

The second modulo register 418 performs a modulo operation for a second reference value ref2 with respect to the second sum value sum2. When the second sum value sum2 is less than the second reference value ref2 (sum2<ref2), the second remainder signal r2 becomes the second sum value sum2. However, when the second sum value sum2 is greater than or equal to the second reference value ref2 (sum2≧ref2), the second remainder signal r2 becomes a value obtained by subtracting the second reference value ref2 from the second sum value sum2 (sum2−ref2). The second input signal I2, the second remainder signal r2, the second sum value sum2, and the second reference value ref2 are m-bit integers with m being a natural number such as 12 for example.

The k most significant bits (k being a natural number such as 8) of the second remainder signal r2 is a first address ADD1. The 2 most significant bits of the first address ADD 1 indicate a position information, or phase information, of a sine wave form for data sampling of the data storage device 430 while the 6 least significant bits signify the address of the data storage device 430, as will be described in more detail herein.

The data processing block 420 reads first data DATA1 from an address of the data storage device 430 as indicated by a second address ADD2 having a sub-set of bits of the first address ADD1. In addition, the data processing block 420 generates second data DATA2 by combining the first data DATA1 and a third address ADD3 that is another sub-set of bits of the first address ADD1.

For example, the second address ADD2[5:0] is the least significant 6-bits of the first address ADD1[7:0], and the third address ADD3[7] is the most significant bit of the first address ADD1[7:0]. The data processing block 420 reads the first data DATA1 comprised of 7 bits DATA1[6:0] from such an address ADD2[5:0] of the data storage device 430. The data processing block 420 generates the second data DATA2 of 8 bits DATA2[7:0] by combining the first data DATA1[6:0] and the third address ADD3[7].

The data processing block 420 includes an address processing unit 422 and a data processing unit 424. The address processing unit 422 receives the first address ADD1[7:0] that sequentially increases with a predetermined period such as from "00000000" to "11111111". The address processing unit 422 generates the second address (ADD2[5:0], 000000~111111) as the least significant 6 bits of the first address ADD1[7:0], and generates the third address ADD3[7] as the most significant bit of the first address ADD1[7:0] (step S200 of FIG. 8).

Note that the 2 most significant bits of the first address ADD1[7:0] indicate a phase of a sine waveform for the data corresponding to the second address ADD2[5:0] of the data storage device 430. For example, when the 2 most significant bits of the first address ADD1[7:0] is "00", the phase of the sine wave form is between 0°-90°. In that case, the second address ADD2[5:0] varies from 0 ("000000") to 63 ("111111") which is just the 6 least significant bits of the first address ADD1[7:0].

Also when the 2 most significant bits of the first address ADD1[7:0] is "10" the phase of the sine wave form is between 180°-270°. In that case also, the second address ADD2[5:0] varies from 0 ("000000") to 63 ("111111") which is just the 6 least significant bits of the first address ADD1[7:0].

When the 2 most significant bits of the first address ADD1[7:0] is "01" the phase of the sine wave form is between 90°-180°. In that case, the address processing unit 422 generates an extended 6-bits (i.e., "000000" with each bit being the MSB of the first address ADD1[7:0], inverts each of such bits to generate an inverted 6-bits (i.e., "111111"), and then performs a bit-to-bit exclusive OR function on the 6 least significant bits of the first address ADD1[7:0] with such inverted 6-bits (i.e., "111111") to generate the second address ADD2[5:0]. In that case, the second address ADD2[5:0] sequentially decreases from 63 ("111111") to 0 ("000000") when the phase of the sine wave form is between 90°-180°.

Similarly, when the 2 most significant bits of the first address ADD1[7:0] is "11" the phase of the sine wave form is between 270°-360°. In that case also, similar steps as described for the 90°-180° phase are performed by the address processing unit 422 to generate the second address ADD2[5:0]. Thus, the second address ADD2[5:0] sequentially decreases from 63 ("111111") to 0 ("000000") when the phase of the sine wave form is between 270°-360°.

Consequently, when the phase of the sine wave form is between 0°-90° or 180°-270°, the second address ADD2 sequentially increases from 0 ("000000") to 63 ("111111"). However, when the phase of the sine wave form is between 90°-180° or 270°-360°, the second address ADD2 sequentially decreases from 63 ("111111") to 0 ("000000"). The address processing unit 422 also generates the third address ADD3[7] as the most significant bit of the first address ADD1[7:0].

The data processing unit 424 reads the first data DATA1[6:0] which has k bits (with k being a natural number such as 7 for example), from the second address ADD2[5:0] of the data storage device 430 (step 300 of FIG. 8). The data processing unit 424 also combines the third address ADD3[7] and the first data DATA1[6:0] to generate the second data DATA2[7:0] (step 400 of FIG. 8).

The relationship between the second address ADD2[5:0] and the first data DATA1[6:0] stored in the data storage device 430, and generation of the second data DATA2 according to an embodiment of the present invention is now described.

Figure 6:
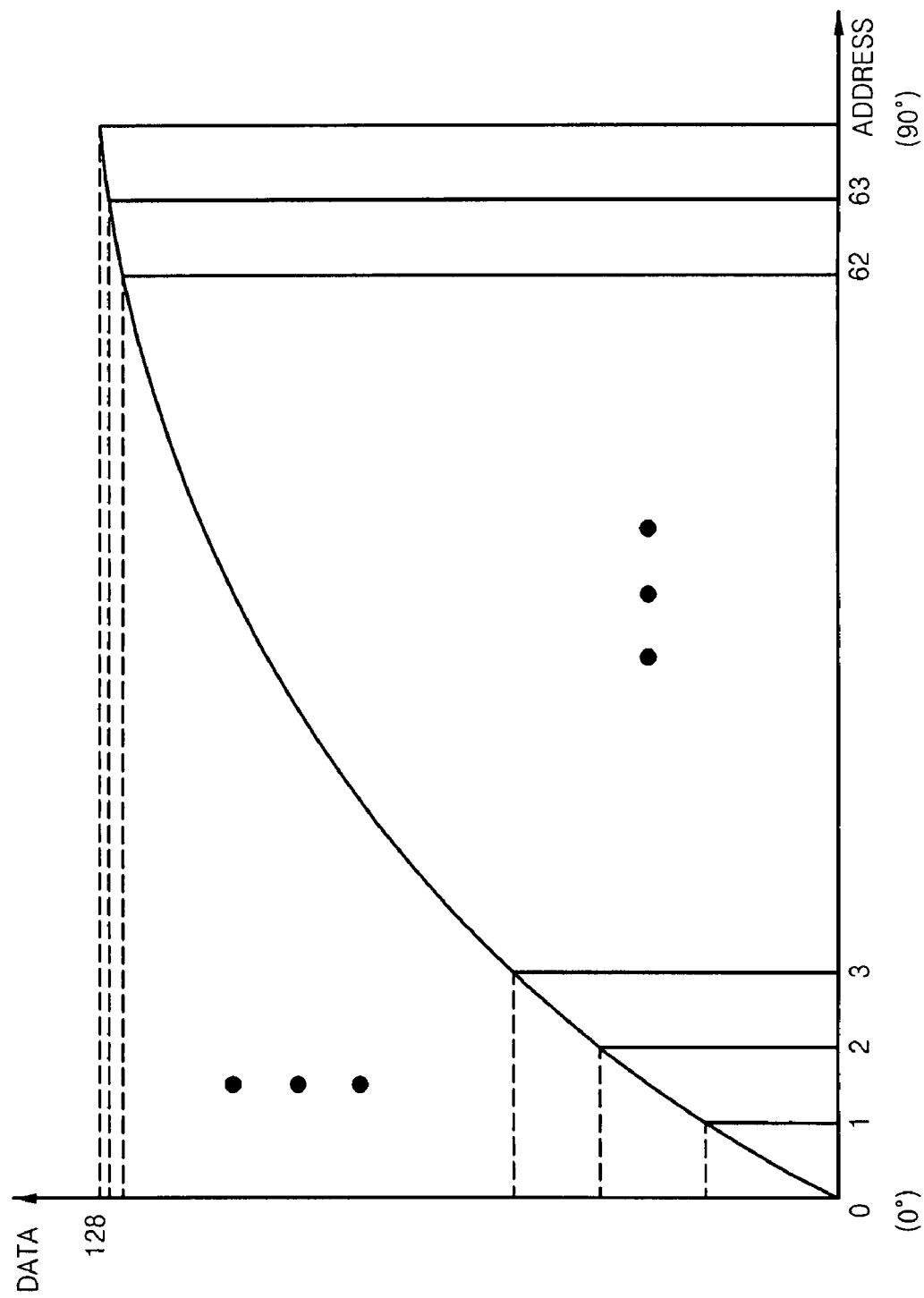
FIG. 6 illustrates data stored in addresses of a data storage device of FIG. 4, according to an embodiment of the present invention.

FIG. 6 is a graph showing the relationship between the second address and the first data stored in the data storage device 430 according to an embodiment of the present invention. Referring to FIG. 6, the phase of a quarter of the full sine wave form (such as from 0° to 90° for example) is divided into 64 sections each assigned a respective one of the addresses of 0 to 63. The data follows a quarter sine wave form with the address variation and is sampled for the phase corresponding to the address.

For example, a data of "1" (that is, "0000001") is stored at the address of 0 (that is, 000000) in the data storage device 430. As the address increases, the data gradually increases so that data of "126" (that is, "1111110") is stored at address 63 (that is, 111111). Thus, the data of the sine wave form of each phase section of a quarter sine wave form (such as from 0° to 90°) is determined as illustrated in FIG. 6.

Table 1 below shows the data stored in each address of the data storage device 430 according to the graph of FIG. 6.

TABLE 1

| | Address | | | | | | | | | | |
|---|---|---|---|---|---|---|---|---|---|---|---|
| | 0 | 1 | 2 | ... | 56 | 57 | 58 | 59 | 60 | 61 | 62 | 63 |
| Data | 1 | 2 | 5 | ... | 124 | 125 | 125 | 125 | 126 | 126 | 126 | 126 |

The address processing unit 422 generates the second address ADD2 that sequentially increases from 0 ("000000") to 63 ("111111") when the phase of the sine wave form is between 0°-90° or 180°-270°, and that sequentially decreases from 63 ("111111") to 0 ("000000") when the phase of the sine wave form is between 90°-180° or 270°-360°. Also, the address processing unit 422 generates the third address ADD3 that is the most significant bit of the first address ADD1.

The data storage device 430 outputs the first data DATA1 that gradually increases from 1 ("0000001") to 126 ("1111110") when the phase of the sine wave form corresponding to the second address ADD2 is between 0°-90° or 180°-270°, and the first data DATA1 that gradually decreases from 126 ("1111110") to 1 ("0000001") when the phase of the sine wave form is between 90°-180° or 270°-360°.

Figure 9:
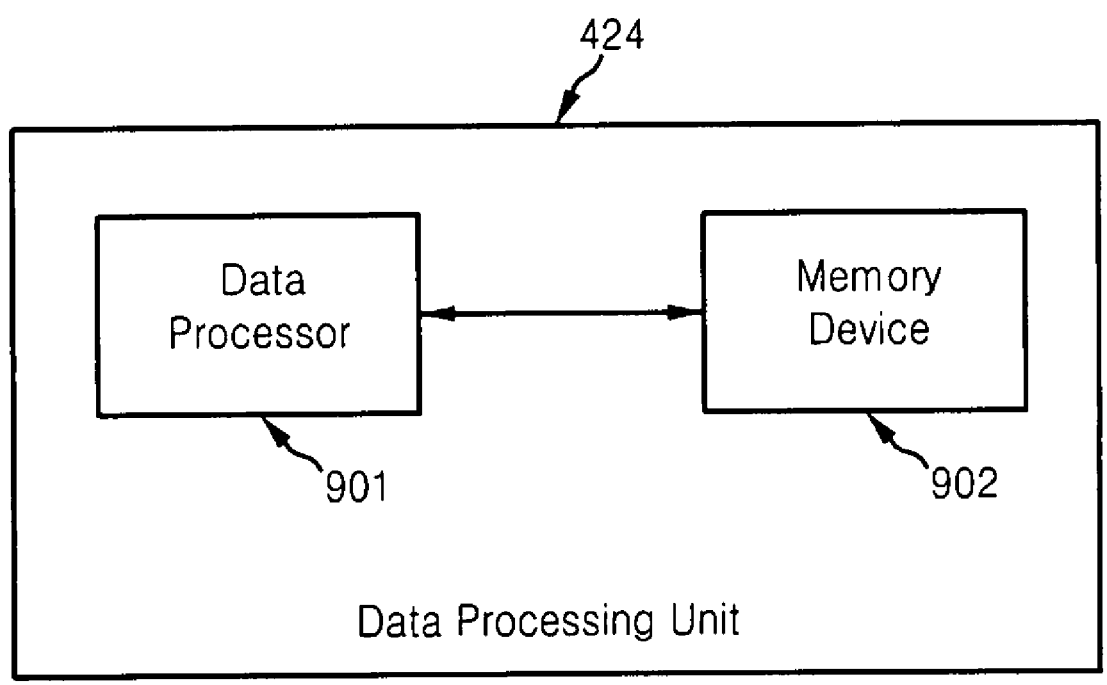
FIG. 9 is a block diagram of a data processing unit in FIG. 4, according to an embodiment of the present invention.

FIG. 9 shows a block diagram of the data processing unit 424 that generates the second data DATA2 from the first data DATA1 and the third address ADD3, in one example embodiment of the present invention. The data processing unit 424 includes a data processor and a memory device 902 having sequences of instructions stored therein (i.e., software). Execution of the sequences of instructions by the data processor 901 causes the data processor 901 to perform the steps as described in the following.

First, the data processor 901 generates a k-bit binary number (where k is a natural number such as 7 for example) with each bit being the most significant bit (that is, a third address ADD3 bit) of the first address ADD1. In addition, the data processor 901 performs a bit-to-bit exclusive OR operation on the first data DATA1 and the k-bit binary number to generate an exclusive OR result.

Second, the data processor 901 generates a (k+1) bit combination having a most significant bit that is a complement of the third address ADD3, and having the exclusive OR result as the remainder k bits. Third, the data processor 901 adds the third address ADD3 to the (k+1) bit combination to generate the second data DATA2 of (k+1) bits.

Examples for generating the second data DATA2 when the first address ADD1 is "00000000" or "10000000" is described below in detail.

When the first address ADD1 is "00000000", the third address ADD3 is "0", and the first data DATA1 is "0000001". The exclusive OR result "0000001" is generated by performing a bit-by-bit exclusive OR operation on the first data DATA1 "0000001" and the k-bit (i.e., 7-bit) binary "0000000" with each bit being the third address ADD3 "0".

Second, the k+1 bit (i.e., 8-bit) combination "10000001" is generated with the most significant bit being the complement of the third address ADD3 "0" and with the exclusive OR result being the remaining 7 bits. Third, the 8-bit second data DATA2 "10000001" is generated by adding the third address ADD3 "0" to the k+1 bit combination.

When the first address ADD1 is "10000000", the third address ADD3 is "1", and the first data DATA1 is "0000001". Thus, the exclusive OR result "1111110" is generated by performing an exclusive OR operation on the first data DATA1 "0000001" and the k-bit (i.e., 7-bit) binary "1111111" with each bit being the third address ADD3 "1".

Second, the k+1 bit (i.e., 8-bit) combination "01111110" is generated with the most significant being the complement of the third address ADD3 "1" and with the exclusive OR result being the remaining 7 bits. Third, the 8-bit second data DATA2 "01111111" is generated by adding the third address ADD3 "1" to the k+1 bit combination.

Table 2 illustrates the second data DATA2 generated with such similar steps for each phase of the sine wave form.

TABLE 2

| Phase | Third Address | First Data | Second Data | Pulse Width |
|---|---|---|---|---|
| 0°-90° | 0 | 1[0000001] | 129[10000001] | 127 |
|  |  | 2[0000010] | 130[10000010] | 126 |
|  |  | 5[0000101] | 131[10000101] | 125 |
|  |  | ... | ... | ... |
|  |  | 124[1111100] | 252[11111100] | 4 |
|  |  | 125[1111101] | 253[11111101] | 3 |
|  |  | 126[1111110] | 254[11111110] | 2 |
| 90°-180° | 0 | 126[1111110] | 254[11111110] | 2 |
| 90°-180° (Continued) | 0 (Continued) | 125[1111101] | 253[11111101] | 3 |
|  |  | 124[1111100] | 252[11111100] | 4 |
|  |  | ... | ... | ... |
|  |  | 5[0000101] | 131[10000101] | 125 |
|  |  | 2[0000010] | 130[10000010] | 126 |
|  |  | 1[0000001] | 129[10000001] | 127 |
| 180°-270° | 1 | 1[0000001] | 127[01111111] | 129 |
|  |  | 2[0000010] | 126[01111110] | 130 |
|  |  | 5[0000101] | 123[01111011] | 133 |
|  |  | ... | ... | ... |
|  |  | 124[1111100] | 4[00000100] | 252 |
|  |  | 125[1111101] | 3[00000011] | 253 |
|  |  | 126[1111110] | 2[00000010] | 254 |
| 270°-360° | 1 | 126[1111110] | 2[00000010] | 254 |
|  |  | 125[1111101] | 3[00000011] | 253 |
|  |  | 124[1111100] | 4[00000100] | 252 |
|  |  | ... | ... | ... |
|  |  | 5[0000101] | 125[01111011] | 133 |
|  |  | 2[0000010] | 126[01111110] | 130 |
|  |  | 1[0000001] | 127[01111111] | 129 |

The counter 440 periodically outputs a digital count value CNT[7:0] that sequentially increases from 0 ("00000000") to 255 ("11111111") in response to a clock signal CLK whenever the second data DATA2 is output from the data processing unit 424. The count value CNT may be formed of the same number of bits as that of the second data DATA2[7:0].

The comparison circuit 450 compares the second data DATA2 and the digital count value CNT to generate a PWM (pulse width modulation) signal (step S500 of FIG. 8). The comparison circuit 450 outputs high (or "1") when the second data DATA2 is less than or equal to the digital count value CNT, and outputs low (or "0") when the second data DATA2 is greater than the digital count value CNT. The basic conversion width of the PWM signal output by the comparison circuit 450 is the same as the cycle of the second data DATA2.

Figure 7:
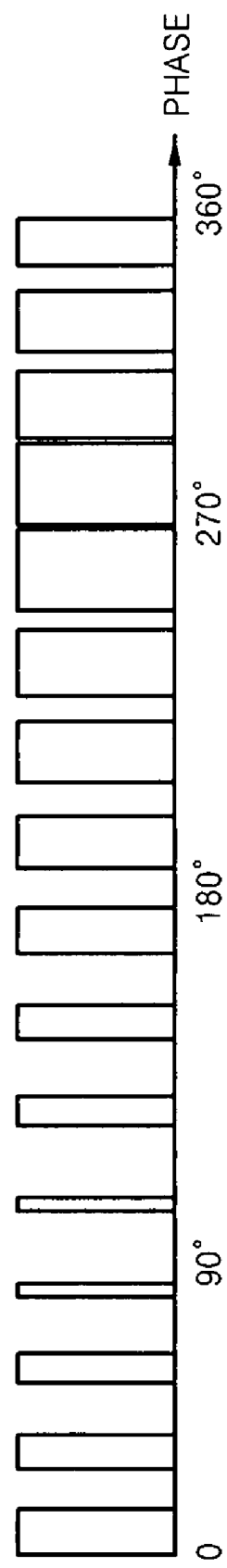
FIG. 7 illustrates an example PWM (pulse width modulation) signal generated by a pulse width modulator in FIG. 4, according to an embodiment of the present invention.

FIG. 7 illustrates the PWM signal output from the pulse width modulator 400, according to an embodiment of the present invention. Referring to Table 1, Table 2, and FIG. 7, the process of determining the pulse width of the PWM signal output from the comparison circuit 450 is now described.

Consider an example of when a phase of the sine wave form is between 0°-90° and a second address ADD2 has a value of "0". In that case, the data processing unit 424 outputs the second data DATA2 having a value of "129". The counter 440 outputs the digital count value CNT that sequentially increases from 0 to 255. The PWM signal maintains a high level when the digital count value CNT is from 129 to 255. Thus, a pulse width of the PWM signal is a period during which the digital count value CNT increases from 129 to 255.

Consider another example of when the phase of the sine wave form is between 0°-90° and the second address ADD2 has a value of "1". In that case, the data processing unit 424 outputs the second data DATA2 having a value of "130". The counter 440 outputs the digital count value CNT that sequentially increases from 0 to 255. The PWM signal maintains a high level when the digital count value CNT is from 130 to 255. Thus, a pulse width of the PWM signal is a period during which the digital count value CNT increases from 130 to 255.

Table 2 shows a respective pulse width of the PWM signal for each possible first address ADD1 generated from the discrete time oscillator 410. Referring to Table 2, the pulse width of the PWM signal is gradually decreased from 127 to 2 in the section of 0°-90°, gradually increased from 2 to 254 in the section of 90°-270°, and gradually decreased from 254 to 129 in the section of 270°-360°, according to the sine wave form.

The signal converting unit 500 supplies motor driving current to the motor 130 in accordance with the corresponding sine wave form in response to the PWM signal from the comparison circuit 450 (step S600 of FIG. 8). When driving current close to an ideal sine wave form is obtained by integrating the PWM signal for being supplied to the motor 130, noise generated during operation of the motor 130 is remarkably reduced compared to the prior art.

In this manner, the DTO 410 generates the first address ADD1 that is processed digitally for in turn generating the PWM signal according to the present invention. The motor driving current derived from such a PWM signal is close to an ideal sine wave form such that motor driving noise is reduced significantly.

The foregoing is by way of example only and is not intended to be limiting. For example, any numbers or number of elements illustrated and described herein are by way of example only. The present invention is limited only as defined in the following claims and equivalents thereof.

What is claimed is:

1. A pulse width modulator comprising:
   a discrete time oscillator for generating a first address of bits;
   a data storage device storing first data at a location indicated by a second address of bits that is generated from a sub-set of the first address bits;
   a data processing block for generating second data from the first data and a third address of at least one bit that is a sub-set of the first address bits;
   a counter for generating a digital count; and
   a comparator for generating a pulse width modulation signal by comparing the second data and the digital count.

2. The pulse width modulator of claim 1, wherein the discrete time oscillator generates the first address bits that sequentially changes in response to a plurality of input signals.

3. The pulse width modulator of claim 2, wherein the discrete time oscillator includes:
   a first modulo register for generating a first remainder and a first carry from a first sum of a first input signal and a first prior remainder, using a first reference value; and
   a second modulo register for generating a second remainder from a second sum of a second input signal, a second prior remainder, and the carry from the first modulo register, using a second reference value,
   wherein the first address bits are generated from the second remainder.

4. The pulse width modulator of claim 1, wherein the counter generates the digital count that sequentially changes in response to a clock signal.

5. The pulse width modulator of claim 1, wherein the comparison circuit generates the pulse width modulation signal having a pulse width that sequentially changes according to a sine wave form.

6. The pulse width modulator of claim 1, wherein the data processing block includes:
   an address processing unit for generating the second address and the third address from the first address; and
   a data processing unit for generating the second data by combining the first data and the third address.

7. The pulse width modulator of claim 6, wherein the data processing unit includes:
   a data processor; and
   a memory device having sequences of instructions stored thereon, wherein execution of the sequences of instructions by the data processor causes the data processor to perform the steps of:
   performing an exclusive OR function on the first data and a k-bit binary number with each bit being the third address that is a most significant bit of the first address to generate an exclusive OR result;
   generating a (k+1) bit combination having a most significant bit that is a complement of the third address, and having the exclusive OR result as a remainder k bits; and adding the third address to the (k+1) bit combination to generate the second data.

8. The motor driver of claim 1, wherein the data processing block includes:
   an address processing unit for generating the second address and the third address from the first address; and
   a data processing unit for generating the second data by combining the first data and the third address.

9. The motor driver of claim 8, wherein the data processing unit includes:
   a data processor; and
   a memory device having sequences of instructions stored thereon, wherein execution of the sequences of instructions by the data processor causes the data processor to perform the steps of:
   performing an exclusive OR function on the first data and a k-bit binary number with each bit being the third address that is a most significant bit of the first address to generate an exclusive OR result;
   generating a (k+1) bit combination having a most significant bit that is a complement of the third address, and having the exclusive OR result as a remainder k bits; and
   adding the third address to the (k+1) bit combination to generate the second data.

10. A motor driver comprising:
    a discrete time oscillator for generating a first address of bits;
    a data storage device storing first data at a location indicated by a second address of bits that is generated from a sub-set of the first address bits;
    a data processing block for generating second data from the first data and a third address of at least one bit that is a sub-set of the first address bits;
    a counter for generating a digital count;
    a comparator for generating a pulse width modulation signal by comparing the second data and the digital count; and
    a signal converting unit for generating a motor driving current having a sine wave form to a motor in response to the pulse width modulation signal.

11. The motor driver of claim 10, wherein the discrete time oscillator generates the first address bits that sequentially changes in response to a plurality of input signals.

12. The motor driver of claim 11, wherein the discrete time oscillator includes:
    a first modulo register for generating a first remainder and a first carry from a first sum of a first input signal and a first prior remainder, using a first reference value; and
    a second modulo register for generating a second remainder from a second sum of a second input signal, a second prior remainder, and the carry from the first modulo register, using a second reference value,
    wherein the first address bits are generated from the second remainder.

13. The motor driver of claim 10, wherein the counter generates the digital count that sequentially changes in response to a clock signal.

14. The motor driver of claim 10, wherein the comparison circuit generates the pulse width modulation signal having a pulse width that sequentially changes according to a sine wave form.

15. A method for generating a pulse width modulation signal, comprising:
    generating a first address of bits;
    reading first data from a location of a data storage device as indicated by a second address of bits that is generated from a sub-set of the first address bits;

generating second data from the first data and a third address of at least one bit that is a sub-set of the first address bits;

generating a digital count; and generating a pulse width modulation signal by comparing the second data and the digital count.

16. The method of claim 15, further comprising:

generating the first address bits that sequentially changes according to at least one modulo function a plurality of input signals.

17. The method of claim 15, further comprising:

generating the digital count that sequentially changes in response to a clock signal.

18. The method of claim 15, further comprising:

generating the pulse width modulation signal having a pulse width that sequentially changes according to a sine wave form.

19. The method of claim 18, wherein the pulse width modulation signal is used to generate a motor driving current having the sine wave form for driving a motor.

20. The method of claim 18, further comprising:

performing an exclusive OR function on the first data and a k-bit binary number with each bit being the third address that is a most significant bit of the first address to generate an exclusive OR result;

generating a (k+1) bit combination having a most significant bit that is a complement of the third address, and having the exclusive OR result as a remainder k bits; and adding the third address to the (k+1) bit combination to generate the second data.

* * * * *